(12) United States Patent
Calvo et al.

(10) Patent No.: US 7,121,079 B2
(45) Date of Patent: Oct. 17, 2006

(54) SYSTEM FOR EXHAUST GAS TREATMENT COMPRISING A GAS IONIZING SYSTEM WITH IONIZED AIR INJECTION

(75) Inventors: Sabine Calvo, Les Clayes sous Bois (FR); Sandrine Dupre, Orsay (FR); Stephane Eymerie, Pacy sur Eure (FR); Alice Goldman, Gif-sur-Yvette (FR); Max Goldman, Gif-sur-Yvette (FR); Yvane Lendresse, Rueil Malmaison (FR)

(73) Assignees: Renault S.A.S., Boulogne Billancourt (FR); Peugeot Citroen Automobiles, Neuilly sur Seine (FR)

( * ) Notice: Subject to any disclaimer, the term of this patent is extended or adjusted under 35 U.S.C. 154(b) by 0 days.

(21) Appl. No.: 10/523,413

(22) PCT Filed: Aug. 29, 2003

(86) PCT No.: PCT/FR03/02614

§ 371 (c)(1),
(2), (4) Date: Feb. 3, 2005

(87) PCT Pub. No.: WO2004/020798

PCT Pub. Date: Mar. 11, 2004

(65) Prior Publication Data

US 2006/0005531 A1    Jan. 12, 2006

(30) Foreign Application Priority Data

Aug. 30, 2002   (FR) .................................. 02 10752

(51) Int. Cl.
*F01N 3/00*   (2006.01)

(52) U.S. Cl. ............... 60/275; 60/284; 60/289; 422/186.07; 422/186.08; 422/186.15; 422/186.3

(58) Field of Classification Search ................. 60/274, 60/275, 284, 286, 299; 422/186.03, 186.07, 422/186.08, 186.15, 186.16, 186.3
See application file for complete search history.

(56) References Cited

U.S. PATENT DOCUMENTS

| 6,030,506 | A  | * | 2/2000  | Bittenson et al. | ........... 204/164 |
| 6,264,899 | B1 | * | 7/2001  | Caren et al. | ............. 422/186.3 |
| 6,274,006 | B1 |   | 8/2001  | Shigemizu et al. | |
| 6,912,841 | B1 | * | 7/2005  | Pfendtner et al. | ............. 60/275 |
| 6,959,538 | B1 | * | 11/2005 | Cho et al. | ..................... 60/275 |

FOREIGN PATENT DOCUMENTS

| AT | 387 158 | | 12/1988 | | |
| CH | 345 765 | | 4/1960 | | |
| EP | 1 020 620 | | 7/2000 | | |
| FR | 2 481 945 | | 11/1981 | | |
| FR | 2862340 | * | 11/2003 | .................. 60/275 |
| GB | 2 284 771 | | 6/1995 | | |
| JP | 04276167 | A * | 10/1992 | ................. 123/567 |
| WO | WO 03/027452 | | 4/2003 | | |

* cited by examiner

*Primary Examiner*—Binh Q. Tran
(74) *Attorney, Agent, or Firm*—Young & Thompson

(57) ABSTRACT

The invention proposes a system (16) for treating the exhaust gases (G) of a motor vehicle combustion engine (10), particularly a lean-burn diesel engine or engine, comprising a burnt gas (G) exhaust circuit (14), of the type in which the exhaust circuit (14) comprises a burnt gas (G) ionization system (22), characterized in that the exhaust circuit (14) comprises an ionized air injection system (24) upstream and/or downstream of the burnt gas (G) ionization system (22).

4 Claims, 2 Drawing Sheets

SYSTEM FOR EXHAUST GAS TREATMENT COMPRISING A GAS IONIZING SYSTEM WITH IONIZED AIR INJECTION

The invention proposes a system for treating the exhaust gases of a motor vehicle combustion engine, particularly a lean-burn diesel engine or petrol engine, comprising a burnt gas exhaust circuit, of the type in which the exhaust circuit comprises a burnt gas ionization system.

The regulations governing vehicle emissions are primarily concerned with four types of pollutant: unburnt hydrocarbons HC, carbon monoxide CO, nitrogen oxides NOx and particulates.

In the case of an engine running with an excess of oxygen, that is a lean-burn petrol engine or a diesel engine, the unburnt hydrocarbon HC and carbon monoxide CO emissions are reduced by using an oxidation catalyst, which converts them to carbon dioxide $CO_2$ in large proportions.

This oxidation reaction is all the more efficient the higher the catalyst temperature. The catalyst is accordingly placed as close as possible to the outlet of the combustion chamber of each engine cylinder.

The nitrogen oxides NOx can be treated by means of a nitrogen oxide NOx trap called a "NOx-trap".

In the case of a lean-burn engine, the use of the nitrogen oxide trap is conditioned by the possibility of locally increasing the fuel-air ratio of the exhaust gases passing through the trap.

Today, however, these systems for treating nitrogen oxides Nox and unburnt hydrocarbons HC are still used very little, because their efficiency is not optimal in all driving conditions. Moreover, their cost is not negligible and their use causes substantial additional fuel consumption.

To contend with the lack of efficiency, research is currently underway on coupling these systems with the non-thermal plasma technology.

The technique consists in forming metastable species, free radicals and highly reactive ions, by collision between the gas molecules and the high-energy electrons produced by a discharge, and without raising the temperature of the medium.

This discharge is obtained by applying high-voltage high-frequency signals across two electrodes whose geometric configurations may be different. In the so-called lean-burn engine exhaust gases, such discharges alter the composition of the gas mixture by promoting reactions such as the oxidation of nitric oxide NO to nitrogen dioxide $NO_2$, the formation of partially oxidized hydrocarbons from the unburnt residues, and finally, oxidation reactions causing the activation of the particulates.

Combined with a catalytic post-treatment system for reducing nitrogen oxides NOx, these plasma-generating discharges, which are located upstream of the catalyst or in the catalyst, serve to obtain higher reduction rates than those obtained with a catalyst alone, and in a much wider range of temperatures.

Combined with a particulate filter, the plasma-generating discharges facilitate the reaction combustion soot, which is necessary to regenerate the filter media. In fact, the formation of oxidizing activated species, such as ozone $O_3$ and nitrogen dioxide $NO_2$, and of reducing species, such as partially oxidized hydrocarbons and activated soot, promotes the initiation of particulate oxidation at lower temperature.

To ensure ever higher reduction efficiencies, it is first necessary to obtain an optimal conversion of nitric oxide NO to nitrogen dioxide $NO_2$.

In general, two main reactions lead to the oxidation of nitric oxide NO to nitrogen dioxide $NO_2$:

$NO+O+M \rightarrow NO_2+M$, where $M=N_2$ or $O_2$ and $NO+O_3 \rightarrow NO_2+O_2$ When non-thermal plasmas are used as "ozonizer" via the treatment of the ambient air, it is possible to produce up to 50 g of ozone $O_3$ per kWh consumed. In this case, the atomic oxygen O formed in the ambient air is fully available for the formation of ozone $O_3$.

Competing reactions to the production of ozone $O_3$, such as nitric oxide NO production reactions, only significantly occur when the power inputs employed are sufficient to introduce a temperature rise that favours the kinetics of formation of nitric oxide NO. The parameters limiting ozone production are the temperature (ozone $O_3$ is thermodynamically unstable at above 600–650 K) and the steam (moisture content).

In the publications "NO Oxidation Process in Dielectric Barrier Discharge using Multipoint-to-plane Electrodes" and "NOx removal for diesel Engine exhaust by ozone injection method" presented at the conference on "Non-thermal plasma technology for pollution control" in April 2001 in South Korea, it was proposed to inject air ionized by a non-thermal plasma, that is to say air that contains a high concentration of ozone $O_3$ in the exhaust gases.

Although such methods help significantly to reduce the quantity of nitrogen oxides NOx present in the exhaust gases, their efficiency is limited to about 60%.

It is an object of the invention to improve the treatment of the nitrogen oxides by non-thermal plasmas.

The invention therefore proposes a treatment system of the type described above, characterized in that the exhaust circuit comprises an ionized air injection system upstream and/or downstream of the burnt gas ionization system.

According to other features of the invention:

the ionized air injection system comprises means for ionizing the ambient air that convert a portion of the oxygen present in the ambient air to ozone;

the air ionization means and the burnt gas ionization system each consist of at least one reactor of the non-thermal plasma-generating discharge type;

the burnt gas ionization system comprises a plurality of reactors arranged in series which successively ionize the burnt gases;

the various reactors are separate compartments of a single vessel;

the exhaust circuit comprises a catalyst for treating nitrogen oxides, that is positioned downstream of the ionized air injection system.

Other features and advantages of the invention will appear from reading the detailed description that follows, with reference to the figures appended hereto, in which:

In the following description, identical, similar or analogous elements are designated by the same reference numerals.

FIG. 1 shows an internal combustion engine 10 that is prepared according to the teachings of the invention.

Figure 1:
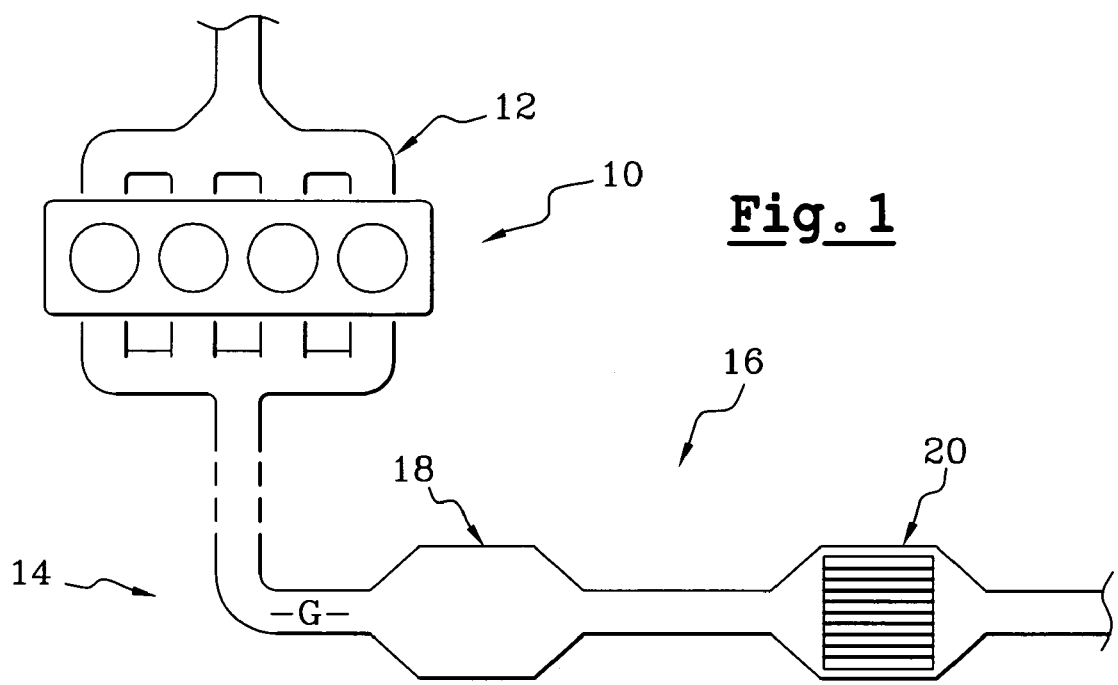
FIG. 1 is a schematic representation of a combustion engine exhaust line that comprises a treatment system according to the invention.

The engine 10 here is of the lean-burn diesel type or petrol type, that is, it runs with an excess of oxygen relative to stoichiometric conditions.

The engine 10 comprises an inlet gas intake circuit 12 and a burnt gas G exhaust circuit 14.

The exhaust circuit 14 comprises a pollution control device 16, that treats the burnt gases G in order to limit the release of pollutants into the air.

The pollution control device 16 comprises a system 18 for treating the burnt gases G, that serves to convert the nitric oxide NO to nitrogen dioxide $NO_2$. Downstream of the treatment system 18, the pollution control device 16 comprises a catalyst 20 which treats the nitrogen dioxide $NO_2$ to convert it to nitrogen $N_2$ and oxygen $O_2$, which are the natural components of air.

Figure 2:
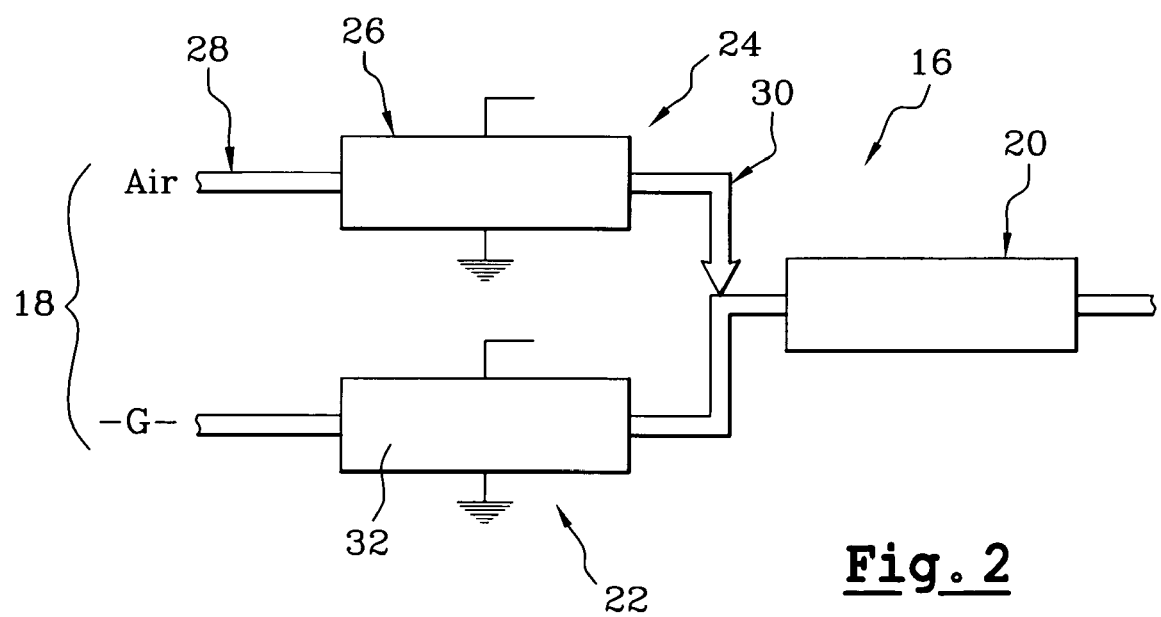
FIG. 2 is a schematic representation of the treatment system shown in FIG. 1.

As shown in FIG. 2, the treatment system 18 comprises a burnt gas G ionization system 22 that consists of a reactor 32 of the non-thermal plasma-generating discharge type.

This reactor is used to oxidize the nitric oxide NO to nitrogen dioxide $NO_2$. The nitric oxide NO is oxidized to nitrogen dioxide $NO_2$ directly or indirectly via atomic oxygen. In fact, as it happens, as confirmed by all studies conducted on the subject, this conversion of nitric oxide NO to nitrogen dioxide $NO_2$ cannot be complete and actually tends towards an asymptotic limit, in particular because the nitrogen dioxide $NO_2$ reaches concentrations such that the reduction reaction

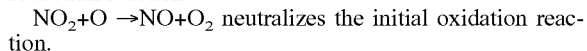
$NO_2+O \rightarrow NO+O_2$ neutralizes the initial oxidation reaction.

For this purpose, and according to the invention, the treatment system 18 comprises an ionized air injection system 24 that is arranged here downstream of the burnt gas G ionization system 22. However, in a variant (not shown) of the invention, the ionized air injection system 24 is arranged upstream of the burnt gas G ionization system 22.

This ionized air injection system 24 comprises an air ionization system 26 that consists of a reactor of the non-thermal plasma-generating discharge type.

The plasmas produced in these reactors 22, 26, 32 are so-called non-thermal plasmas, generated by discharges of the "corona discharge" type. They are produced across electrodes that are bare or covered with dielectric barriers of various configurations ranging from parallel planes and in this case with at least one dielectric barrier, to geometries with a strongly heterogeneous applied field (multipoint-to-plane, coplanar wire or screw-to-plane, coaxial wire or screw-to-cylinder, etc.).

The inter-electrode spacing (defined as the distance between electrodes in the absence of dielectric, between the electrode and the dielectric in the presence of a single dielectric barrier, between dielectrics in the presence of two dielectric barriers), may be identical or different for each of the reactors and, moreover, variable according to the treatment conditions (gas throughput to be treated, for example).

The gaseous effluents, injected at atmospheric or different pressure, can flow perpendicular or parallel to the plasma. Finally, depending on the geometry adopted, the power supply of the reactors 22, 26, 32, which can be common or different for each reactor 22, 26, 32, supplies a variable voltage that may be DC, pulsed or AC.

The ionized air injection system 24 comprises an ambient air intake circuit 28 which connects the reactor 26 to the ambient air via an air filter (not shown).

According to the invention, the reactor 26 converts the oxygen O present in the air to ozone $O_3$ and it is able to produce about 50 g of ozone $O_3$ per kWh consumed.

The ionized air that contains the ozone $O_3$ produced is then injected into the exhaust circuit 14 via an injection line 30 downstream of the burnt gas G ionization system 22, so that the ozone $O_3$ produced reacts with the nitric oxide NO initially present in the burnt gases G, when the ionized air injection system 24 is arranged upstream of the burnt gas G ionization system, or with the residual nitric oxide NO present in the burnt gases G when the ionized air injection system 24 is arranged downstream of the burnt gas G ionization system 22.

The treatment system 18 further comprises means (not shown) for controlling the air ionization reactor 26 to produce the quantity of ozone $O_3$ necessary for the conversion of all the nitric oxide NO.

This makes it possible to convert all the nitric oxide NO present in the burnt gases G.

Figure 3:
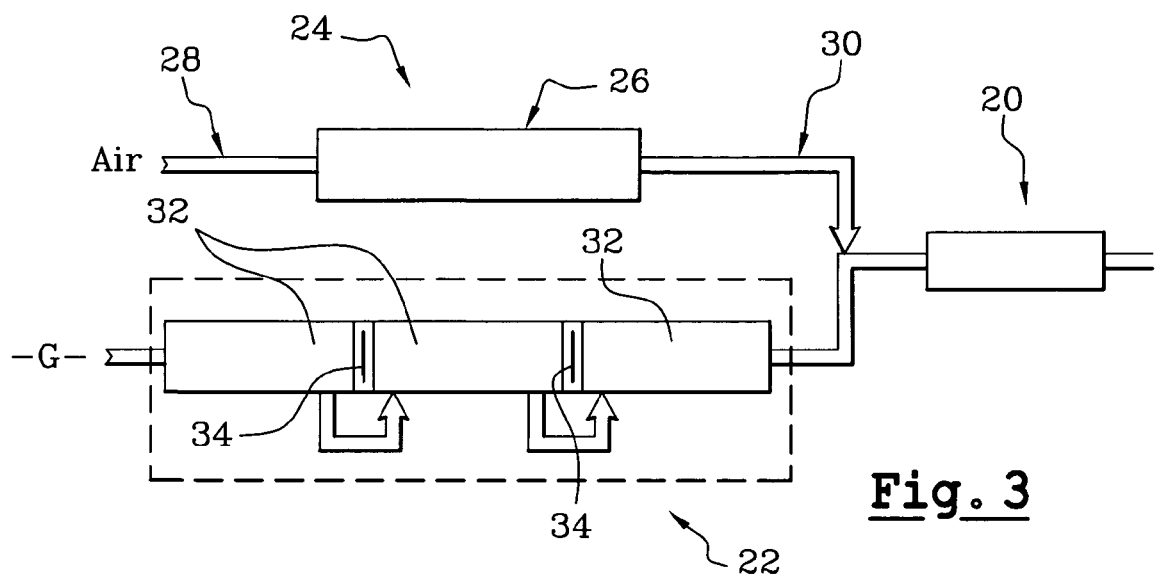
FIGS. 3 to 5 are similar views to that of FIG. 2 showing variants of the invention.

According to a first variant of the invention shown in FIG. 3, the gas ionization system 32 comprises a plurality of reactors 32, three in number here, which are arranged in series and which successively ionize the burnt gases G.

Since the burnt gases G are ionized several times, the quantity of nitric oxide NO converted to nitrogen dioxide $NO_2$ is close to the asymptotic limit value defined above, so that the ionized air injection system only needs to produce a reduced quantity of ozone $O_3$.

Figure 5:
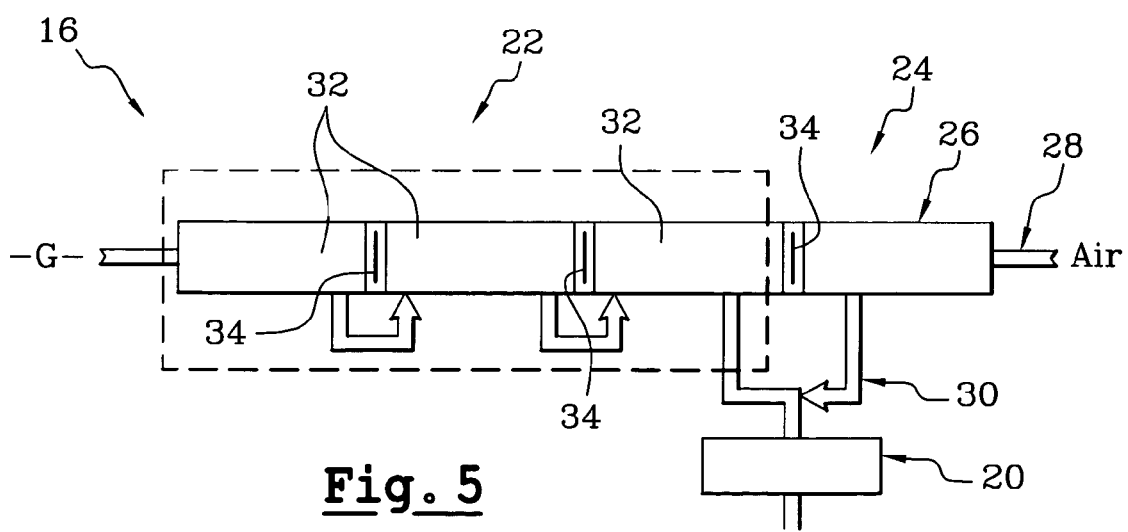

According to a preferred embodiment of the invention shown in FIGS. 3 and 5, the various reactors 32 are compartments of a single vessel which are separated from one another by walls 34, which may or may not be gastight.

Figure 4:
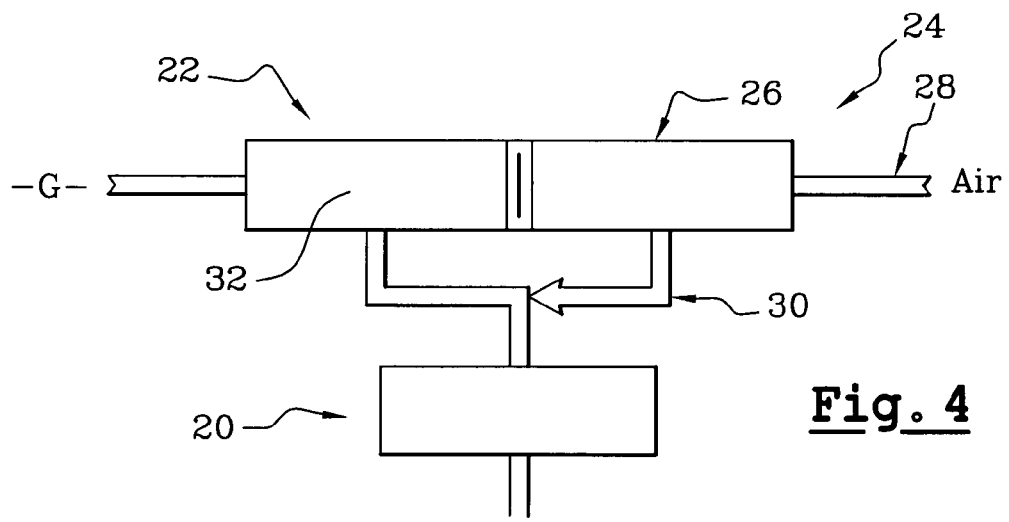

According to a second variant of the invention shown in FIGS. 4 and 5, the two reactors, that of the gas ionization system 22 and that of the air ionization system 26, are two compartments of a single vessel which are separated from one another by a wall 34 that is gastight.

According to this variant, the gas ionization system 22 may comprise only a single reactor 32, as shown in FIGS. 2 and 4, or a plurality of reactors 32 arranged in series, which are themselves compartments of a single vessel.

Such an arrangement allows a reduction in the total volume of the treatment device 18, which then consists of a single vessel.

Whatever the embodiment of the treatment device 18, the various reactors 26, 32 are supplied with electricity by a single power supply or by high-voltage power supplies that may be identical or different, depending on the function of the reactor 26, 32 with which they are associated.

The invention claimed is:

1. System (16) for treating the exhaust gases (G) of a motor vehicle combustion engine (10), particularly a lean-burn diesel engine or petrol engine, comprising a burnt gas (G) exhaust circuit (14), of the type in which the exhaust circuit (14) comprises a burnt gas (G) ionization system (22) and an ionized air injection system (24) upstream and/or downstream of the burnt gas (G) ionization system (22), which comprises means (26) for ionizing the ambient air that convert a portion of the oxygen present in the ambient air to ozone, and of the type in which the air ionization means (26) and the burnt gas (G) ionization system (22) each consist of at least one reactor (26, 32) of the non-thermal plasma-generating discharge type, characterized in that the burnt gas (G) ionization system (22) comprises a plurality of reactors (32) arranged in series which successively ionize the burnt gases (G).

2. Treatment system (16) according to claim 1, characterized in that the various rectors are separate compartments of a single vessel (18).

3. Treatment system (16) according to claim 1, characterized in that the exhaust circuit (14) comprises a catalyst (20) for treating nitrogen oxides, that is positioned downstream of the ionized air injection system (24).

4. Treatment system (16) according to claim 2, characterized in that the various rectors are separate compartments of a single vessel (18).

\* \* \* \* \*